March 22, 1966  A. G. REDFIELD  3,242,424
INDUCTIVE COUPLING CIRCUIT
Filed Oct. 31, 1963
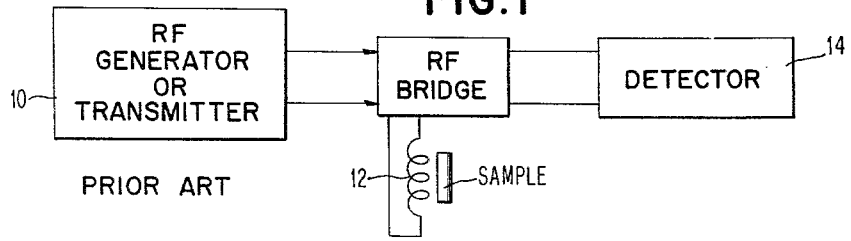
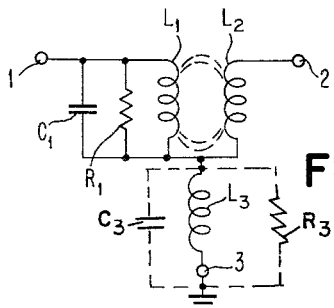
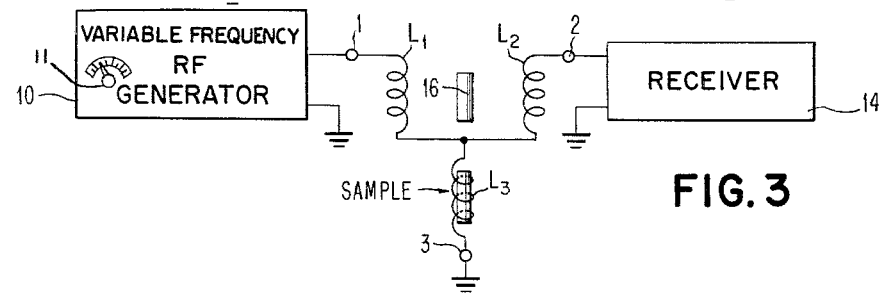
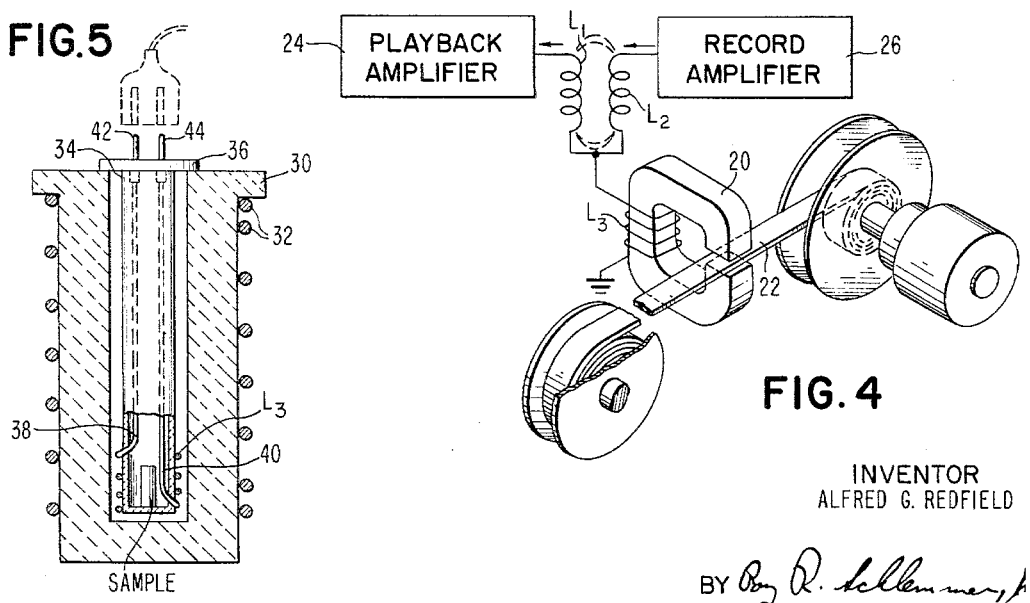
INVENTOR
ALFRED G. REDFIELD
BY
ATTORNEY

United States Patent Office 3,242,424
Patented Mar. 22, 1966

3,242,424
INDUCTIVE COUPLING CIRCUIT
Alfred G. Redfield, New York, N.Y., assignor to International Business Machines Corporation, New York, N.Y., a corporation of New York
Filed Oct. 31, 1963, Ser. No. 320,320
6 Claims. (Cl. 324—.5)

The present invention relates to a novel inductive coupling circuit. More particularly, it relates to systems including such a circuit wherein the coupling characteristics are utilized to isolate or couple certain portions of the systems.

A great variety of coupling circuits have been developed over the years utilizing standard passive elements such as resistors, inductors, capacitors and various combinations and permutations of these elements to couple or transfer a signal or electrical energy from one circuit to another. In the usual sense, a coupling circuit is utilized to couple signals from a signal source to a receiving stage. However, in certain instances such a coupling circuit may be used to detect various electrical circuit characteristics. In such a case, the coupling circuit is normally referred to as a bridge circuit. These bridge circuits are well known in the art and usually comprise four legs of a square across one diagonal of which is connected a transmitter or signal source and across the other diagonal of which is connected a sensitive measuring device, such as a microammeter. In such circuit arrangements, an unknown circuit element, which may be an inductor, capacitor or a resistor depending upon whether the bridge is of an A.C. or D.C. type, is placed in one leg of the bridge when the other three elements are known and a calibrated variable element of the bridge circuit adjusted until a null is detected across the detection branch of the circuit, at which point the magnitude of the unknown circuit portion may be computed using well known Kirckoff's law equations. Conversely, the bridge circuit may be balanced and a variable introduced at some point in the circuitry and either the occurrence of an unbalance may be used to indicate the occurrence of a condition or the magnitude of the unbalance may be utilized in determining the magnitude of the disturbance which caused the unbalance of the circuit. This latter characteristic makes bridge circuits especially suitable for detecting extremely minute changes in some parameter of a previously balanced bridge circuit. For example, with an A.C. bridge, the various legs of the circuit may be A.C. responsive elements such as inductors or capacitors. In such a situation, a bridge circuit type of detector may be thought of as a coupling circuit for coupling an input signal, i.e., the signal or voltage produced by the transmitter or generator and an output circuit or the detection means which detects or picks up any change in a particular circuit parameter which produces an unbalance and then a current flow in the detector.

Further problems exist in A.C. circuitry when it is desired to either utilize a circuit such as an A.C. bridge circuit for detection means or when coupling A.C. signals from one circuit to another in that such circuits are usually highly frequency dependent. In other words, they have certain optimum or design operating frequencies or frequency ranges and operation outside of these ranges renders the results either poor or totally unacceptable.

In the field of applied physics where it is desired to measure or detect nuclear resonance, two types of systems are currently in use for accomplishing such detection. One involves an R.F. bridge circuit. In this system, a sample in which nuclear spins are generated is placed inside a special coil which is connected to said bridge circuit in which the generator voltage is many orders of magnitude larger than the detector voltage, and for which any small change in the impedance of the coil containing this sample provides a measurable output when nuclear resonance occurs. The basis of the indication of nuclear resonance is the fact that when nuclear resonance is achieved, the inductance and Q of the coil in which the sample is located change slightly, i.e., on the order of a few parts per million; however, even this small change is sufficient to unbalance the bridge. The disadvantage of this system is that it is quite frequency dependent and whenever the interrogation or generator frequency is changed, the entire circuit must be continually rebalanced. This is due to the large number of circuit elements necessary, all of which have strong capacitance and inductance which in the R.F. range cause many problems. Such apparatus is both expensive and the balancing procedure is quite time consuming when it is desired to sweep a wide range of frequencies to determine if nuclear resonance is occurring in the sample in any particular one.

Another arrangement frequently used to determine nuclear resonance is that of the "crossed coil bridge" as disclosed for example, in U.S. Patent No. Re. 23,950 of F. Bloch, et al. This system is frequency independent, however, the apparatus is quite bulky since a total of four separate coils forming a type of bridge circuit are required as the detectors and a strong static magnetic field must be applied across the sample by means of appropriate magnetic means including magnet and pole pieces. It is obviously quite difficult to utilize such a structure in the examination of nuclear resonance in many of the materials which are now being investigated where the sample must be placed in either a cryostat or an oven, depending upon whether the investigation is being made at cryogenic or elevated temperatures.

It has now been found that an extremely simple yet efficient and sensitive inductive coupling circuit may be made utilizing a single inductor connected in series with two mutually inductively coupled inductors. If the inductors are chosen so that the inductance of the single inductor is exactly equal and opposite to the mutual inductance of the two other inductors, a unique coupling and detection circuit is achieved. The circuit may be utilized to either isolate a primary and secondary side of the circuit or may be utilized as in an R.F. bridge to detect changes in inductance as manifested by a change in the inductive coupling balance between the two mutually inductively coupled legs of the circuit and the single inductor.

The term "coupling circuit" as used herein is intended to define the three inductor system disclosed and is intended to include a use wherein the circuit is to uncouple an input and an output circuit rather than to couple same.

It is accordingly a primary object of the present invention to provide a novel coupling circuit.

It is a further object to provide a coupling circuit made up of three inductive elements, two of which are mutually inductively coupled together.

It is yet another object to provide such a circuit which is substantially frequency insensitive.

It is yet another object to provide an inductive circuit capable of being used alternatively to selectively couple between an input and output section of said circuit or to completely isolate an input and output section of said circuit.

It is another object to provide an inductive circuit capable of detecting minute changes in the reluctance of a sample material.

It is a still further object to provide a novel nuclear resonance detection device.

The foregoing and other objects, features and advantages of the invention will be apparent from the following more particular description of a preferred embodiment of the invention, as illustrated in the accompanying drawings.

In the drawings:

FIGURE 1 represents a block diagram of a prior art R.F. bridge type of nuclear resonance detection device.

FIGURE 2a is a schematic diagram of the novel inductive circuit of the present invention.

FIGURE 2b is a schematic diagram of the circuit of FIGURE 1 with a modification to compensate for changes in the Q and stray capacitance of the circuit.

FIGURE 3 is a combination block and schematic diagram of a nuclear resonance detection device constructed in accordance with the teachings of the present invention.

FIGURE 4 is a combination perspective and block diagram of a recording system utilizing the teachings of the present invention; and FIGURE 5 is a cross sectional view of a sample inductor and its container adapted for insertion in a cryostat or oven.

The objects of the present invention are accomplished in general by providing an inductive coupling circuit comprising three inductors. Two of these inductors are inductively coupled together to define a mutual inductance of $M_{1,2}$. One terminal of each of said first two inductors is electrically connected to form a common terminal and the other ends of each of these inductors constitutes one connection respectively to two external circuit means. A third inductor is provided having one end connected to said common terminal between the first two inductors and the other end of the third inductor serves as a common connection to the two external circuits. The third inductor is located so that there is no mutual inductive coupling between it and either of the other two inductors and the mutual inductance $M_{1,2}$ is of an inductance value equal and opposite to the inductance $L_3$ of the third inductor as defined by the formula: $L_3 = -M_{1,2}$. By choosing these inductance values, any A.C. signal applied across one of the individual external circuit terminals and the common external circuit terminal will not appear across the other external circuit terminal and the common terminal as a result of the canceling of the signal in the output circuit due to the above relationships.

One manner of utilizing this circuit is to selectively introduce a variable parameter into the system namely to change the inductance of the inductor $L_3$ as by introducing a material into the air gap within said inductors that will change the inductance such as a material which will exhibit nuclear resonance phenomenon when suitably actuated by an R.F. field of proper frequency.

Although three inductor circuits resembling the present circuit have been known in the past and more especially in certain basic engineering texts where the mathematical current voltage relationships existing in a primary and secondary circuit are to be determined for the purpose of familiarizing a student with the basic theories of inductors in alternating current, the precise circuit and relationships set forth and claimed in this invention have neither been described nor utilized for the practical purposes to be set forth hereinafter.

As set forth above, the basic circuit envisioned by the present invention comprises the three inductors shown as $L_1$, $L_2$ and $L_3$ connected as shown in FIGURE 2a. When the inductance of $L_3$ is equal and opposite to the mutual inductance of the inductors $L_1$ and $L_2$ or $M_{1,2}$, the application of an alternating current signal across the terminals 1 and 3 will result in no signal appearing across the terminals 2 and 3. The reason for this is that as an alternating current is passed from terminal 1 to terminal 3, a certain voltage drop will occur across the inductor $L_1$ and the inductor $L_3$. When looking into terminals 2 and 3, the external circuit will, of course, see the voltage drop across inductor $L_3$; however, an additional voltage is developed in inductor $L_2$ due to the inductive coupling between inductors $L_1$ and $L_2$ and since the windings have been chosen so that $L_3 = -M_{1,2}$, the voltage generated in $L_2$ will be exactly equal to and opposite of that appearing across $L_3$, thus, the resultant of the voltages seen between terminals 2 and 3 will be 0. This is, of course, assuming that the above inductance relationships are maintained. Assuming that the inductor $L_3$ and the mutual inductors $L_1$ and $L_2$ are wound on conventional coil forms with an air core, when any material is introduced into the air gap within the mutual inductors $L_1$ and $L_2$ or the inductor $L_3$, the value of the individual inductor will vary as will the mutual inductance of the circuit $M_{1,2}$ provided, of course, that the material has a different permeability than air.

As is well known, the mutual inductance between the two circuits, i.e., inductors $L_1$ and $L_2$, is the constant by which the time rate of change of current in either circuit must be multiplied to give the E.M.F. thereby induced in the other circuit. Mutual inductance depends upon the shape and dimensions of the circuits, the number of turns and the nature of the surrounding medium. In the present device, the shape, dimension and number of turns of the mutual inductances $L_1$ and $L_2$ remain fixed; it is hence the nature of the surrounding medium or the material in the air gap which is subject to change and which may be utilized in a preferred embodiment of the present invention to balance the circuit. Formulas for actually mathematically determining mutual inductance, taking into consideration differences in the permeability of the surrounding medium, may be found in a number of engineering texts. These formulas are extremely complicated and restating them here would serve no purpose; however, it should be noted that the permeability or reluctance of the surrounding medium of two mutually inductive circuit elements has a pronounced effect on the resultant mutual inductance of the two circuits. Thus, for the usual transformer or mutual inductor type of device where two coils are wound coaxially on a single form, there is a great deal of difference in the mutual inductance whether the coil form and the material in the interior of the coils and form is a standard transformer iron or air. It may be generally stated that the greater the permeability of the surrounding medium, the higher will be the mutual inductance, i.e., the greater the coupling. The same principle is, of course, also true for the single inductor $L_3$ when the material of the air gap is changed, the inductance of the coil will change. This principle is utilized in the present invention, in that the circuit is carefully adjusted to a balanced condition by moving a ferrite slug into the coil or air gap of the mutual inductance so that there will be no signal transfer between the primary and secondary circuits, i.e., terminals 1 and 3 and terminals 2 and 3 respectively, and the sample is introduced into the air gap of the single inductor. Under normal conditions, when a change in the permeability in the inductive circuit, i.e., $L_3$, is introduced, for example, by the occurrence of a nuclear resonance in the sample, the inductance is changed slightly, thus allowing some signal to be transferred from the primary to the secondary circuit since the prior balanced condition wherein the inductance of inductor $L_3$ was equal and opposite to the mutual inductance $M_{1,2}$ no longer exists.

Referring to the previously mentioned relationship of the inductors $L_1$, $L_2$ and $L_3$ wherein it was stated that $L_3 = -M_{1,2}$, it should be noted that by convention, a mutual inductance may be represented by either a positive or negative value depending upon the various winding configurations involved while a single coil or inductor is considered to have a positive inductance. Hence, the desired inductive relationship is expressed with the inductance of the coil $L_3$ being positive and the mutual inductance $M_{1,2}$ being expressed as a negative quantity.

In the above general description of the device, it has been assumed that a sample whose physical characteristics will cause the magnetic properties of an air gap to change has been placed in the center of inductor $L_3$, however, it is to be understood that it could be equally well introduced into the air gap of the mutual inductance coils $L_1$ and $L_2$ with similar results.

The circuit of the present invention has the further advantage of being substantially frequence independent since the balance of the circuit does not depend on inductive reactance but on the actual inductance and mutual inductance of the circuit elements themselves. For example, in bridge circuits, the balance of the bridge is dependent upon the very precise ratio of the current distribution around the legs of the bridge which is, of course, determined by the respective reactances of the said legs, and any non-uniformity in the circuit elements will cause an unbalance as the frequency is charged. In experimental use of the present device as a nuclear resonance detector, it has been found to retain balance and to remain operative without substantial adjustment over a range of several hundred kilocycles.

It is apparent that the present circuit has other utility than in a nuclear resonance detection instrument wherein the mutual inductance is caused to change upon the occurrence of a nuclear resonance in a sample material. For example, the inductor $L_3$ may be utilized as a common load for a primary and secondary circuit respectively, wherein two signal sources could feed this load alternatively without requiring switching means since the occurrence of a signal across either the terminals 1, 3 or 2, 3 will produce the desired voltage drop across the inductor $L_3$ and yet produce no voltage drop or signal across the circuit not being currently energized. A number of specific embodiments utilizing the principles of the invention will be described subsequently with reference to the drawings.

In practice it happens that the inductance $L_3$ may have a low Q and a large shunt stray capacitance; the shunt capacitance may arise, for example, from a short length of cable connecting $L_3$, which may be in a cryostat or oven, to the inductors $L_1$ and $L_2$. If the equivalent circuit of $L_3$ (looking from the end of the cable going to $L_3$) can be represented as a shunt capacitance $C_3$ and shunt resistance $R_3$ across $L_3$, then the bridge as shown in FIGURE 2a will not be balanced. If, however, a resistance $R_1$ and capacitance $C_1$ are connected across $L_1$ as shown in FIGURE 2b, such that $$R_1/R_3 = C_3/C_1 = L_1/L_3$$

and if $L_3 = -M_{1,2}$, then the bridge will be balanced independent of frequency as before. The shunt capacitance and resistance $R_1$ and $C_1$ were used in an operating embodiment of the invention utilizing an inductor $L_3$ as illustrated in FIGURE 5 in order to achieve better balance.

Referring now to specific apparatus utilizing the present invention, in FIGURE 1 there is shown schematically a prior art representation of an R.F. bridge detection circuit for detecting nuclear resonance. Such R.F. bridge systems for detecting nuclear resonance are quite well known, reference being made specifically to the article by Bloembergen, Purcell, and Pound, Physical Review, vol. 73, p. 679, 1948. Generally speaking, the sample material is placed within a single R.F. coil and the coil is energized by an R.F. field as indicated by the generator 10. When the frequency of the energizing field of such a system equals the Larmor or characteristic frequency of the nucleus being excited in the sample, the nuclear resonance effect occurs and as stated previously, the permeability of the sample as well as other magnetic effects within the nuclei of the actual sample molecules occur, thus changing the inductance of the coil 12. Assuming that the bridge has first been completely balanced, this de-tuning of the inductance 12 causes the detector 14 to produce an output indication.

This method provides a relatively sensitive system for detecting nuclear resonances; but, as stated previously, suffers from the severe limitation that the R.F. bridge is quite frequency sensitive and any substantial variation of the energizing frequency causes the bridge to be de-tuned and makes it difficult to obtain true detector indications.

Referring now to FIGURE 3, a very similar type of circuit to that shown in FIGURE 1 utilizing the principles of the present invention are shown. In this system, the sample is placed again within the coil $L_3$ so that when nuclear resonance occurs, the permeability and thus the inductance and Q of the inductor $L_3$ will vary. The circuit is initially balanced by moving ferrite slug 16 into the inductors $L_1$ and $L_2$ until a null output is obtained. The principle of energizing the sample with the variable frequency R.F. generator or transmitter 10 having, for example, a manual tuning control 11 is basically the same as that of the prior art system of FIGURE 1, as is the detector or receiver 14 which detects an unbalance indicative of a signal being transmitted through the inductive coupling circuit comprising $L_1$, $L_2$ and $L_3$. In operating the device of the invention, the sample is placed in the inductor $L_3$ and with an R.F. field applied to the combination of $L_1$ and $L_3$, the system is balanced by adjusting slug 16 to provide no output at theh receiver, in other words, so that $L_3$ exactly equals $-M_{1,2}$ as described in detail previously. Now, as the R.F. generator is swept through the frequency at which nuclear resonance occurs, the nuclei of the sample will begin absorbing energy from the system and the inductance and Q of $L_3$ will change as is well known in such nuclear resonance experiments and since the mutual inductance of the combination of $L_1$ and $L_2$ is fixed, the balance of the circuit is destroyed and a signal is detected by receiver 14 to provide an output indication or an indication that a nuclear resonance point has occurred at the particular frequency of the R.F. generator 10.

This system has been successfully used for measuring nuclear resonance and has the combined advantages of being substantially frequency independent, which is a distinct advantage over the R.F. bridge method illustrated in FIGURE 1 and is far less bulky than the cross coil method illustrated in the Bloch et al. Patent No. Re. 23,950 mentioned above. This latter feature allows experiments on samples being investigated to be conveniently carried out in either cryostats or ovens where the bulk of the cross coil type of arrangement renders such experiments very difficult. The complication of frequency dependence in the R.F. bridge makes it very difficult and time consuming to perform experiments with this device with any degree of accuracy. The present system has proved itself a very useful tool in this particular field of investigation and has performed a number of successful experimental investigations. An article by M. Eisenstadt to be published circa November 1963 in the "Physical Review" lists the results of a number of experiments run on samples placed in an oven at approximately 800° C. to measure nuclear resonance points.

FIGURE 5 shows a simplified cross sectional view of a part of the apparatus used in conducting typical nuclear resonance experiments. Numeral 30 represents the body of a small electrically heated oven with heating coils 32. The inductor $L_3$ is wound on a support from 34 such as quartz capable of withstanding the oven temperatures. Leads 38 and 40 connected to either end of the inductor $L_3$ are brought out the end of the support tube to the terminals 42 and 44 from whence the device may be connected to the mutual inductors $L_1$ and $L_2$ as well as the generator 10 and receiver 14. The sample is placed as shown in a suitable non-magnetic container and inserted in the tube 34 within the inductor $L_3$. This embodiment is, of course, only representative of one suitable for performing nuclear resonance experiments and is not intended to be construed as limiting on possible alternative structures capable of achieving the same results.

As stated previously, the present invention is not in and of itself limited to a nuclear resonance detector in that the coupling circuit has a wide range of applications wherever it is desired to isolate two separate circuits where a common circuit element is to be used and it is desired to avoid having physical switching means to switch the common circuit element from one to the other. Such an arrangement is shown by way of example in FIGURE 4 where a single tape head 20 is shown adjacent a magnetic tape 22. As is well known, the single head 20 may be used to either write or listen to the magnetic signals recorded on the tape 22. In this system, the recording amplifier 26 and the play-back amplifier 24 are connected to the inductances $L_2$ and $L_1$ respectively, and down through the common inductance $L_3$ which is also the main drive winding for the combination record, play-back head 20. In this case, it would normally be necessary to provide a switch for switching the winding $L_3$ from the record amplifier 26 or the play-back amplifier 24 as the recording signal would be very likely to damage or overload the play-back amplifier because of its magnitude. However, with the present circuit, there is no signal transfer from the record circuit and the play-back circuit due to the fact that the voltage drops produced by the record amplifier in inductors $L_1$ and $L_3$ in the play-back circuit cancel each other out as set forth previously. On play-back, it will be apparent that when a signal is produced in inductor $L_3$, it is available technically to both the amplifiers 24 and 26; however, only the amplifier 24 is connected to utilize the signal as an input and no harm can be done to amplifier 26.

The above is but one instance of a manner in which the present invention may be utilized as a decoupling network. The inductor $L_3$ may form a common load for any two input devices wherein the load may be energized from either source alternately without requiring physical switching from one input to the other and wherein there would be no signal fed through between the two circuits which might be damaging to either one.

The coupling circuit of the present invention may also be used in a manner similar to that for detecting nuclear resonance, for detecting simple changes in the permeability of a material located within the core of the test coil $L_3$ by passing or placing a material whose permeability is subject to change within said coil or air gap and having once balanced the circuit for no output in the detector then introducing such incremental changes in permeability as may be present in the medium being tested and detecting such changes as set forth in the description of the nuclear resonance detector.

Substantially the same apparatus as shown in FIGURE 4 could be used for this purpose. However, instead of a magnetic tape passing through the air gap of member 20, a material such as a deformable plastic tape whose thickness and thus permeability varies would feed through same. Assuming the circuit was first balanced with a first thickness of the tape in the air gap, a signal will be produced at the receiver 26 whenever the thickness of the tape and thus the permeability of the air gap varies.

In summary, the coupling circuit of the present invention when used in conjunction with an R.F. generator and a suitable detector, provides an extremely valuable tool for detecting nuclear resonances in that it is both substantially frequency independent and further is quite compact and may be inserted together with a sample inside of a cryostat or oven which is far more difficult with the more cumbersome crossed coil type of detectors. The device has further utility in that it is a very effective decoupling means for connecting two different signal sources to a common load in that a signal from either source supplied to the load through the circuit of the present invention is not transmitted to the other signal source.

While the invention has been particularly shown and described with reference to a preferred embodiment thereof, it will be understood by those skilled in the art that various changes in form and details may be made therein without departing from the spirit and scope of the invention.

What is claimed is:
1. A nuclear resonance detection system comprising:
   three inductors, two of said inductors being inductively coupled together having a mutual inductance of $M_{1,2}$,
   a first terminal of one of said two inductors comprising one terminal of a first external circuit means,
   a first terminal of the other of said two inductors comprising one terminal of a second external circuit means,
   a second terminal of each of said two inductors being electrically connected together,
   a third inductor having an inductance $L_3$ having a first end connected to said common terminal between said first two inductors and the other end serving as a common terminal to said first and second external circuit means, said third inductor being free of mutual inductive coupling with either of said first two inductors wherein the inductance of said third inductor is substantially equal and opposite to the mutual inductance of said first inductors satisfying the equation: $L_3 = -M_{1,2}$,
   a variable frequency A.C. generator means for applying a signal to one of said two external circuits,
   detection means connected to the other of said two external circuits,
   means for changing the inductance of said third inductor to unbalance the said equation whereby energy will be coupled from said generator means to said detection means comprising:
   a magnetically polarized nuclear sample located within said third inductor, and
   means for varying the frequency of the A.C. generator through a range of frequencies such that when a nuclear resonant condition occurs in said sample, the inductance of said third inductor will vary.
2. A nuclear resonance detection system as set forth in claim 1 wherein said third inductor is mounted on one end of an elongated hollow coil form constructed of a non-magnetic material provided with means for receiving the nuclear sample within the interior of said inductor,
   including means for bringing electrical current leads from said inductor out of the opposite end of said coil form from the coil and for connection to said generator and detector means.
3. A nuclear resonance detection system as set forth in claim 2 wherein the third inductor has stray shunt capacitance $C_3$ and stray shunt resistance $R_3$,
   means for balancing the inductive coupling circuit which comprises a shunt capacitor $C_1$ and a shunt resistor $R_1$ of such value in parallel with one of said two inductors such that the ratio
   $$R_1/R_3 = C_3/C_1 = L_1/L_3$$
   is maintained in the circuit.
4. A system for detecting changes in permeability of a sample medium comprising:
   A.C. generator means,
   inductive coupling circuit means, and
   detection circuit means,
   said coupling circuit means comprising two inductors having an inductance $L_1$ and $L_2$ and inductively coupled together to form a mutual inductance of $M_{1,2}$, two terminals of said two inductors being connected together to form a common terminal and the other terminal of each inductor being coupled to one terminal of the A.C. generator means and one terminal to the detection means respectively,
   a third inductor having an inductance $L_3$, a first end of which is connected to the common terminal between said first two inductors and the other end of which forms a common terminal for connection to the A.C. generator and the detection means respectively, said third inductor being adapted for introducing materials having different magnetic permeability into magnetic circuit relationship with said third inductor means whereby changes in permeability of the material change the inductance of said third inductor, means for balancing said coupling circuit so that the inductance $L_3$ of the third inductor is equal and opposite to the mutual inductance of the first two inductors $M_{1,2}$ defining the equation: $L_3 = -M_{1,2}$ with said A.C. generator means supplying a known frequency to the system with a portion of the sample material of a selected permeability located within said third inductor.

5. A nuclear resonance detection system including:

three inductors, two of said inductors being inductively coupled together having a mutual inductance of $M_{1,2}$, a first terminal of one of said two inductors comprising one terminal of a first external circuit means, a first terminal of the other of said two inductors comprising one terminal of a second external circuit means, a second terminal of each of said two inductors being electrically connected together, a third inductor being wound upon a core form defining an air gap therein and having an inductance $L_3$, a shunt capacitance $C_3$ and a shunt resistance $R_3$, a first end of said third inductor connected to said common terminal between said first two inductors and the other end serving as a common terminal to said first and second external circuit means, said third inductor being free of mutual inductive coupling with either of said first two inductors, wherein the inductance of said third inductor is substantially equal and opposite to the mutual inductance of said first inductors satisfying the equation: $L_3 = -M_{1,2}$, means for selectively changing the permeability of said air gap and the inductance $L_3$ of said third inductor so that the equality defined by said equation no longer exists whereby a signal occurring in one of said two external circuit means will be coupled through the coupling circuit to the other, and means for balancing the system including a capacitor $C_1$ and a resistor $R_1$ placed in parallel with one of said first two mutual inductors having an inductance $L_1$ and $L_2$ wherein the ratios of the magnitudes of the capacitances are chosen to conform to the equation: $R_1/R_3 = C_3/C_1 = L_1/L_3$.

6. A single tape head recording system comprising:

three inductors, two of said inductors being inductively coupled together having a mutual inductance of $M_{1,2}$, a first terminal of one of said two inductors comprising one terminal of a first external circuit means, a first terminal of the other of said two inductors comprising one terminal of a second external circuit means, a second terminal of each of said two inductors being electrically connected together, a third inductor comprising the drive winding on a magnetic tape head and having an inductance $L_3$ having a first end connected to said common terminal between said first two inductors and the other end serving as a common terminal to said first and second external circuit means, said third inductor being free of mutual inductive coupling with either of said first two inductors, wherein the inductance of said third inductor is substantially equal and opposite to the mutual inductance of said first inductors satisfying the equation: $L_3 = -M_{1,2}$, a record amplifier being connected to said first external circuit means and adapted to apply recording signals and current to said system, and a play-back amplifier connected to said second external circuit means, said system being balanced to maintain the equality $L_3 = -M_{1,2}$.

References Cited by the Examiner

UNITED STATES PATENTS

| 2,435,487 | 2/1948 | Adler | 323—51 X |
| 2,569,691 | 10/1951 | Roberts | 324—34 X |
| 2,999,135 | 9/1961 | Wiegand | 179—100.2 |

FOREIGN PATENTS 451,094  7/1936  Great Britain.

CHESTER L. JUSTUS, Primary Examiner.

MAYNARD R. WILBUR, Examiner.